United States Patent [19]  
Jansen et al.

[11] Patent Number: 4,873,147  
[45] Date of Patent: Oct. 10, 1989

[54] PROCESS FOR WATERPROOFING STARCH BINDERS

[75] Inventors: Johannes J. Jansen; Bernardus H. F. Mossou; Hans Poort, all of Veendam, Netherlands

[73] Assignee: Coöperatieve Verkoop- en Produktievereniging van Aardappelmeel en Derivaten 'AVEBE' B.A., Veendam, Netherlands

[21] Appl. No.: 155,042

[22] Filed: Feb. 11, 1988

[30] Foreign Application Priority Data

Feb. 11, 1987 [NL] Netherlands ............... 8700330

[51] Int. Cl.$^4$ .................. B32B 3/26; B32B 5/16; B32B 23/04
[52] U.S. Cl. .................. 428/533; 428/321.5; 428/402.2; 427/393.4
[58] Field of Search .................. 427/150–152, 427/213.31, 213.32, 213.33, 393.4; 428/533, 402.2, 321.5

[56] References Cited

U.S. PATENT DOCUMENTS

| | | | |
|---|---|---|---|
| 4,199,619 | 4/1980 | Oda et al. | 427/150 |
| 4,734,395 | 3/1988 | Ogata et al. | 427/150 X |
| 4,745,097 | 5/1988 | Mackawa et al. | 427/152 X |

Primary Examiner—Michael Lusignan

[57] ABSTRACT

This invention relates to a process for applying waterproof starch layers to substrates, which comprises applying an aqueous starch dispersion containing a waterproofing agent to the substrate and then drying same.

In order to improve the processability and processing time of the binders, this invention is characterized in that the waterproofing agent or a catalyst which catalyzes the reaction of the waterproofing agent with the starch molecules is present in the starch dispersion in the form of microcapsules, and that, after applying the starch dispersion to the substrate, the waterproofing agent is reacted with the starch molecules by digesting disrupting or puncturing the microcapsules.

5 Claims, No Drawings

PROCESS FOR WATERPROOFING STARCH BINDERS

FIELD OF THE INVENTION

This invention relates to processes for applying waterproof starch layers to carriers (substrates). According to the invention the waterproofing agents or catalysts capable of catalyzing the reaction of the waterproofing agents with the starch molecules are present in the aqueous starch dispersions to be applied to the substrate in the form of microcapsules. After applying the starch dispersion to the substrate the microcapsules are broken down or digested so as to enable the waterproofing agent to react with the starch molecules present. Thus, waterproof starch layers can be obtained.

BACKGROUND OF THE INVENTION

Starch dispersions are used, among other things, as a binder in adhesive compositions and coating slips or sizes for paper. After evaporation of the major part of the water a dried starch layer is obtained which interconnects the constituents of the final product. In a number of cases the use of starch products in the above applications involves the drawback that the starch layer applied and dried is not water-resistant (waterproof). Under the influence of moisture and water the resulting bond will disintegrate after a short time.

A plurality of methods are known for preparing starch binders which, after having been applied to the carrier material and dried, are resistant to the action of water. The most important method of waterproofing starch binders is the addition of a reactive component (insolubilizing agent, waterproofing agent, cross-linking agent) to the starch dispersion. After the starch dispersion has been applied to the substrate, the desired waterproofness can be obtained by reaction of the insolubilizing agent with the starch molecules. The production of waterproof starch layers generally comprises the following three phases:

(a) Preparation of the adhesive composition or coating slip (hereinafter also called compositions) consisting of starch, water, waterproofing agent, and, if required, other components (catalyst, pigment, dispersing agent).

(b) Application of a layer of the adhesive composition between two substrates or of the coating slip to a substrate (in general paper and/or paperboard).

(c) Drying of the applied layer whereby a waterproof starch layer is obtained by reaction of the insolubilizing agent with the starch molecules.

Insolubilizing agents applicable in this respect are glyoxal, urea-formaldehyde resins, melamine-formaldehyde resins, ketone-formaldehyde resins and phenol-formaldehyde resins. These waterproofing agents each have their specific drawbacks with respect to odour, toxicology, pH conditions (required for obtaining sufficient waterproofness), degree of waterproofness and discolouration of the carrier material.

A general drawback of the above-described methods is the problem of durability (pot-life) of the adhesive compositions and coating slips or sizes before their application to the substrate. Prior to applying those compositions to the carrier material they have to be useful for a specific period of time. The fact is that there is a risk that, owing to premature reactions between the insolubilizing agent and the starch molecules, the viscosity of the compositions will undesirably increase. This viscosity may become so high that the compositions can no longer be processed by the machines used for applying these products to the substrate. The durability or pot life is affected in particular by the pH, the temperature, the nature and concentration of the insolubilizing agent and by the nature and concentration of the starch product. It is sometimes necessary to use starch products having very low viscosity and/or low starch concentrations. It may also be necessary to adjust the pH value of the binder in such a manner that no optimum waterproofing of the applied and dried starch layer is obtained. Furthermore, often suitable combinations of specific starch derivatives with specific waterproofing agents cannot be used, because their simultaneous presence too strongly limits the durability (pot-life) of the compositions before they can be applied to a substrate.

The Invention

This invention provides a process for obtaining waterproof starch layers on carrier materials in which the problem with the durability (pot-life) of the compositions does not occur or is reduced. The present invention relates to a process for applying waterproof starch layers to substrates, which comprises applying an aqueous starch dispersion containing a waterproofing agent to the substrate and then drying same, characterized in that the waterproofing agent or a catalyst capable of catalyzing the reaction of the waterproofing agent with the starch molecules is present in the starch dispersion enclosed in the form of microcapsules, and that, after applying the starch dispersion to the substrate, the waterproofing agent is reacted with the starch molecules by breaking up or digesting the microcapsules.

Starch is here to be taken to mean not only native starch but also the modified starches, such as the low-viscous starches (oxidized, dextrinated, acid-decomposed, enzymatically decomposed), starch esters, starch ethers, cross-linked starches, cold-swellable starches and the modified starches obtained by combinations of said modifications. As starting material different starches may be used, such as potato starch, maize or corn starch, wheat starch, tapioca starch and waxy maize starch. The properties of the different starches are described by J. J. M. Swinkels in Starch/Stärke, 37, (1985), No. 1, pages 1-5.

Microencapsulation is the envelopment (encapsulation (or liquid droplets of small solid particles with in a polymeric material with microscopically small capsules being obtained. For the production of these microcapsules special techniques have been developed, such as spray-drying, interfacial polymerization, coating, vacuum encapsulation, encapsulation in the fluidized stated and coacervation. Natural and synthetic polymers may be used as the wall material for the microcapsules, such as gum arabic, gelatin, starch products, wax, glass, polyacrylates, polyamide, ethyl cellulose, cellulose acetate, polystyrene, polyethylene, polyepoxides, polyurethane, polyvinyl alcohol and polyvinyl acetate.

In the process according to the invention the microcapsules used contain waterproofing agents. Examples of these agents are glyoxal, the reaction products of glyoxal and urea, urea-formaldehyde resins, melamine-formaldehyde resins, ketone-formaldehyde resins, phenol-formaldehyde resins, salts of tri- or multivalent starch insolubilizing metals (e.g., aluminum salts, zirconium salts) and starch cross-linking agents, such as sodium trimetaphosphate. In the process according to the invention, however, there may also be used microcapsules containing a catalyst which, after the microcapsules have been disrupted digested, is capable of catalyzing the reaction of the waterproofing agents with the starch molecules. Examples of suitable catalysts are acids, bases or salts which enable or promote the reaction between the waterproofing agent and the starch molecules by adjusting the optimum pH value or otherwise. The encapsulating coating agent must be such that no reaction occurs with the encapsulated waterproofing agent or the encapsulated catalyst.

According to this invention the microcapsules are broken down or digested after the adhesive composition or coating slip has been applied to the carrier material. The microcapsules may be broken in various ways. The capsule wall is chemically, enzymatically, physically (heat, dissolution) or mechanically (pressure) disrupted whereby the encapsulated waterproofing agent or the encapsulated catalyst is released. Subsequently, the waterproofing agent can react with the starch molecules.

In an embodiment of the process according to this invention there is first composed an adhesive composition or coating slip consisting of a starch product, water, a waterproofing agent segregated in the form of microcapsules and, if required, other components. The waterproofing agent is shielded from the starch molecules by the capsule wall so that no premature reaction takes place between these two components of the composition. Consequently, there is obtained a coating composition having excellent durability (pot-life). The composition is then applied to the carrier material or between two substrates and dried. Before, during or after drying the microcapsules are broken whereby the waterproofing agent is released and can react with the starch molecules. This reaction gives the desired waterproof starch layer. In another embodiment of the process according to this invention an adhesive composition or coating slip is composed which consists of a starch product, water, a waterproofing agent (non-encapsulated), an enclosed catalyst in the form of microcapsules and, if required, other components. The catalyst is shielded from the waterproofing agent and the starch molecules by the capsule wall so that no premature reaction takes place between these two components. Consequently, compositions are obtained having excellent stability or pot-life. The composition is then applied to the carrier material or between two substrates and dried. Prior, during or after drying the microcapsules are disrupted so as to release the catalyst and enable or accelerate the reaction between the waterproofing agent and the starch molecules. Thus, a waterproof starch layer can be obtained.

The starch containing compositions of this invention can be used for the making of waterproof coated paper and waterproof adhesive compositions in the production of, e.g., corrugated paper, laminated paper, laminated paperboard and paper bags. The process according to this invention can be advantageously used in all those cases in which it is desirable that the viscosity of the adhesive composition or coating slip remain practically stable for a long period of time.

An embodiment of this invention is the making of waterproof coated paper which comprises insolubilizing phosphoric starch esters by means of tri- or multivalent metal ions (e.g., aluminum ions). Starch phosphates excellently react with aluminum ions. It is not quite possible, however, to include aluminum salts in the coating slip, because the aluminum ions immediately react with the starch phosphate. Consequently, the viscosity of the coating slip or composition increases so rapidly that is can no longer be applied to the paper by the conventional machines. The stability of (pot-life) of a coating slip containing both starch phosphate and soluble aluminum salts is too poor for industrial uses. The very favourable combination of starch phosphates and aluminum ions until now could only used according to a two-bath process in which a solution of the starch phosphate is first applied to the paper and only then a solution containing the aluminum salt. This two-bath process, however, is too laborious or expensive in practice.

In the process according to this invention a suitable aluminum salt can be incorporated in encapsulated form into a coating composition which also contain starch phosphate. As a result of the encapsulated state the aluminum ions do not react with the starch phosphate molecules so that the durability (pot-life) of the coating slip is considerable. After the coating slip has been applied to the paper, the microcapsules are broken whereby the aluminum ions are released and can react with the starch phosphate. Thus, a waterproof coated paper can be obtained. The microcapsules can be crushed by exerting mechanical pressure on the paper, e.g., in the calendering process. The process described has the advantage that it needs only one bath.

EXAMPLE 1

In a (400 ml) beaker 100 parts of a phosphoric ester of potato starch having a combined phosphate content of 16.3 mg/g solid matter were suspended in 160 parts of tap water. In a water bath this starch suspension was heated under agitation at 85° C. for 30 minutes. The resulting starch solution was then cooled to 50° C. The viscosity of the solution was measured with a Brookfield LVF Viscometer, spindle 3, rpm 12, and was 2200 mPa.s. The pH of the solution was 6.3.

Subsequently, 5 wt.% microencapsulated aluminum sulphate was added to the solution under agitation. The aluminum sulphate particles having a diameter of 2-32 microns were enveloped within a wax having a melting point of 85° C. (so-called microcapsules). The viscosity of the resulting dispersion measured with a Brookfield LVF Viscometer, spindle 3, rpm 12, was 2900 mPa.s. The pH of the starch dispersion containing the micro capsules was 6.3.

The thus prepared adhesive solution was spread with a doctor blade on 50 g bleached kraft paper and then adhered to 500 g grayboard (so-called Schrenz quality). The adhesive applied was 10 g/m² (dry). After 5 seconds hot pressing (temperature 120° C.) at a pressure of 3.5 bar the laminate was immersed in water of 25° C. After 3.5 hours complete delamination (release) occurred. In the same manner as described above a laminate was prepared with no aluminum sulphate being added. The laminate adhered released after immersion in water of 25° C. within 5 minutes. In the same mamnner as described above a laminate was prepared with no aluminum sulphate being added. When the aluminum sulphate is added in non-microencapsulated form, spontaneous cross-linking occurs, which results in complete gelling of the solution so that this solution cannot be used as adhesive.

EXAMPLE 2

The following coating slip was prepared:

To 1291 g water in a 2 l plastic beaker, 22.5 g dispersing agent (Dispex N40; Allied Colloids) and 3 g sodium hydroxide were added under slow agitation (Pendcaulik stirrer). Then 3000 g china clay (SPS from English China Clay) were added. The whole was dispersed for 20 minutes at 3000 rpm. The resulting pigment slurry (A) had a solid matter content of 69%.

In a 750 ml beaker 166 g of a phosphoric ester of potato starch having a combined phosphate content of 15.9 mg/g solid matter were suspended in 334 g tap water. In a water bath this starch suspension was heated under agitation at 92° C. for 20 minutes. The resulting starch solution (B) was then cooled to 60° C. The viscosity of the solution was measured with a Brookfield LVF Viscometer, spindle, 4, 60 rpm, and was 452 mPa.s. The pH of the starch solution was 6.4 and the solid matter content 29.8%.

The 2536 g pigment slurry A, 466 g starch solution B were added under agitation. After 5 minutes agitation 140 g latex (Dow Latex 685 from Dow Chemical) were added under agitation. Then 400 g water were added. The resulting coating slip (C) had a pH of 8.0 and a solid matter content of 55%. The Brookfield viscosity at 25° C. and 60 rpm was 1480 mPa.s.

To 1000 g coating slip C, 10 wt.% microencapsulated aluminum sulphate (as described in Example 1), calculated on starch weight, were added under agitation. The viscosity of this coating slip (D) was the same as that of coating slip C.

To 1000 g coating slip C, 10 wt. % aluminum sulphate, calculated on starch, were added in the form of an aqueous solution with 10% solid matter (i.e. non-microencapsulated). Consequently, the viscosity of this coating slip (E) increased to above 100,000 mPa.s. and was therefore no longer to be applied to paper in the conventional manner.

The coating slips C and D were applied with a doctor blade to sheets of paper having a width of 20 cm and a length of 30 cm. The yield (application) was 15 g/m².

The paper employed was 70 g/m², groundwood free and was filled with 22% calcium carbonate.

Some sheets were dried by means of an infrared lamp. The waterproofness measured according to F. R. Adams, Tappi, 43 (11), 923–927, (1960), was 46% in respect of sheets coated with coating slip C and 95% in respect of sheets coated with coating slip D.

Some other sheets were immediately calendered after application of the coating slips with a laboratory calender (Gebr. Kersten) through 2 nips at 50° C. and at 30 kg/cm line pressure. The waterproofness of sheets coated with coating slip C was 11%, and the waterproofness of the sheets coated with coating slip D was 92%.

What we claim:

1. A process for applying waterproof starch layers to substrates, which comprises the steps of applying an aqueous starch dispersion containing a starch-reacting waterproofing agent to the substrate and then drying same, wherein the waterproofing agent or a catalyst which catalyzes the reaction of the waterproofing agent with the starch molecules is distributed through the starch dispersion enclosed in microcapsules, and wherein after applying said starch dispersion to the substrate, the waterproofing agent is reacted with the starch molecules by breaking down the microcapsules, thus releasing said agent or said catalyst.

2. The process according to claim 1, including the steps of applying the dispersion as a waterproof adhesive composition.

3. The process according to claim 1, including the steps of applying the dispersion for the making of waterproof coated paper.

4. The process according to claim 3, wherein said waterproofing is achieved by using a phosphoric starch ester as the starch product and a microencapsulated aluminum salt as the waterproofing agent to be released by breakdown of said microcapsules.

5. A substrate provided with a waterproof starch layer prepared by the process according to any one of claims 1–4.

* * * * *